US009494442B2

(12) United States Patent
Varoglu et al.

(10) Patent No.: US 9,494,442 B2
(45) Date of Patent: Nov. 15, 2016

(54) USING MULTIPLE TOUCH POINTS ON MAP TO PROVIDE INFORMATION

(71) Applicant: Apple Inc., Cupertino, CA (US)

(72) Inventors: Devrim Varoglu, Santa Clara, CA (US); Swapnil R. Dave, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 232 days.

(21) Appl. No.: 13/627,985

(22) Filed: Sep. 26, 2012

(65) Prior Publication Data

US 2014/0088870 A1 Mar. 27, 2014

(51) Int. Cl.
*G01C 21/30* (2006.01)
*G01C 21/32* (2006.01)
*G01C 21/36* (2006.01)

(52) U.S. Cl.
CPC ....... *G01C 21/3614* (2013.01); *G01C 21/3664* (2013.01)

(58) Field of Classification Search
CPC .................................................. G01C 21/3664
See application file for complete search history.

(56) References Cited

U.S. PATENT DOCUMENTS

| 8,810,535 | B2* | 8/2014 | Moosavi | G06F 3/04883 345/156 |
| 2007/0106466 | A1* | 5/2007 | Noguchi | 701/209 |
| 2009/0284479 | A1* | 11/2009 | Dennis | G06F 3/04883 345/173 |
| 2011/0224896 | A1* | 9/2011 | Napieraj | 701/200 |
| 2012/0092266 | A1* | 4/2012 | Akella | 345/173 |
| 2012/0259541 | A1* | 10/2012 | Downey et al. | 701/433 |

* cited by examiner

*Primary Examiner* — Yonel Beaulieu
*Assistant Examiner* — Lail Kleinman
(74) *Attorney, Agent, or Firm* — Fish & Richardson P.C.

(57) ABSTRACT

A device includes a touch sensitive surface for receiving touch input or gestures associated with two or more markers representing two or more locations defining a route on a map display. Based on the touch input or gesture, information associated with the route is provided to the user including, for example, the travel distance between the two or more locations and an estimated travel time. In some implementations, a gesture associated with two or more markers representing locations on a map display opens a user interface for providing travel directions for a route associated with the two or more locations.

34 Claims, 7 Drawing Sheets

USING MULTIPLE TOUCH POINTS ON MAP TO PROVIDE INFORMATION

TECHNICAL FIELD

This disclosure relates generally to computer user interfaces for navigation applications.

BACKGROUND

Modern devices (e.g., smart phones, electronic tablets) often include a mapping application that allows a user of the device to track their location and the location of other users on a geographic map display. The mapping applications may include a search engine to allow users to enter a search query to search for a particular point of interest, such as a business. The map display is usually generated from a map database that includes information for defining geographic boundaries for administrative areas (e.g., counties, cities, towns) based on geographic survey information. The mapping applications also allow users to generate a route and get turn-by-turn directions by entering departure and destination locations.

Modern devices include a touch sensitive surface for receiving input from a user. For example, a smart phone or electronic tablet can include a touch sensitive display that is configured to receive touch input and gestures from a user to invoke various functions or applications on the device.

SUMMARY

A device includes a touch sensitive surface for receiving touch input or gestures associated with two or more markers representing two or more locations defining a route on a map display. Based on the touch input or gesture, information associated with the route is provided to the user including, for example, the travel distance between the two or more locations and an estimated travel time. In some implementations, a gesture associated with two or more markers representing locations on a map display opens a user interface for providing travel directions for a route associated with the two or more locations. A first gesture provides directions from a first location represented by the first marker to a second location represented by the second marker. A second gesture provides directions from the second location represented by the second marker to the first location represented by the first marker.

Particular implementations disclosed herein provide one or more of the following advantages. A user can easily discover travel information by using simple touch input and gestures on a map display without opening another application, dialogue or page.

The details of the disclosed implementations are set forth in the accompanying drawings and the description below. Other features, objects, and advantages will be apparent from the description and drawings, and from the claims.

DESCRIPTION OF DRAWINGS

The same reference symbol used in various drawings indicates like elements.

DETAILED DESCRIPTION

Example Mapping Application

Figure 1:
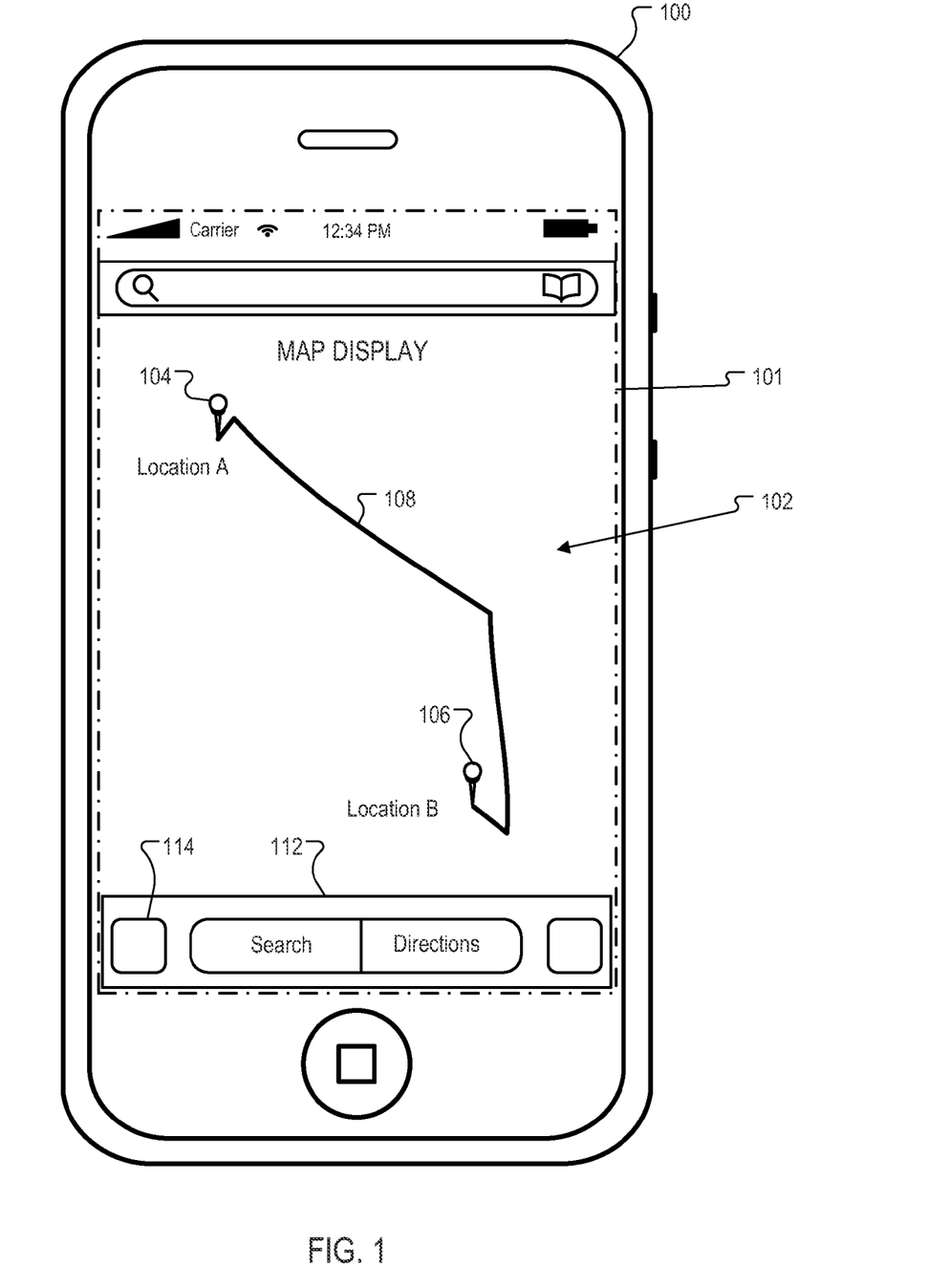
FIG. 1 illustrates an example mapping application for generating a route on a map display of a device.

FIG. 1 illustrates an example mapping application for generating a route on a map display of a device. In some implementations, device 100 can include touch sensitive display 101 for presenting a user interface provided by the mapping application. Device 100 can be any device that is capable of presenting a map display and receiving touch input and/or gestures, including but not limited to a smartphone, electronic tablet, e-mail device, wearable device, notebook computer, kiosk, game, etc. In some implementations, touch input can be received through other types of touch sensitive surfaces, such as a touch pad.

The user interface can include map display 102 and control bar 112. Control bar 112 can include a toggle button that allows a user to open a search user interface or a directions user interface. In the example shown, a search user interface is opened on touch sensitive display 102. The user has performed a search and two locations are represented by location markers 104, 106 (e.g., pushpins) on map display 102. Route 108 is drawn on map display 102 between markers 104, 106. The user can touch markers 104, 106 to expose information about the location. Markers 104, 106 can be different colors to distinguish a current or departure location and a destination location. Route 108 can be different colors to represent traffic conditions. Button 114 can be used to determine the current location of device 100 and to place a marker on map display 102 representing the current location. In some implementations, voice commands can be used to initiate a search, which can result in markers 104, 106 being automatically dropped onto map display 102 and route 108 being drawn.

In conventional mapping applications, travel information is often displayed at fixed location. Displaying travel information at a fixed location has several drawbacks. The text often is small font and therefore difficult to see on a small screen. In addition, a portion of the user interface is dedicated to displaying the travel information even though a user may only occasionally want to see the travel information. This dedicated portion of the user interface can no longer be used to display other information, which is undesirable on devices with small screens that need to maximize usable screen area. Another drawback is that the travel information can be displayed only for a single point-to-point route on the map display and not for point-to-multipoint or multipoint-to-multipoint routes, as to do so would consume even more screen space and is therefore undesirable.

Figure 2:
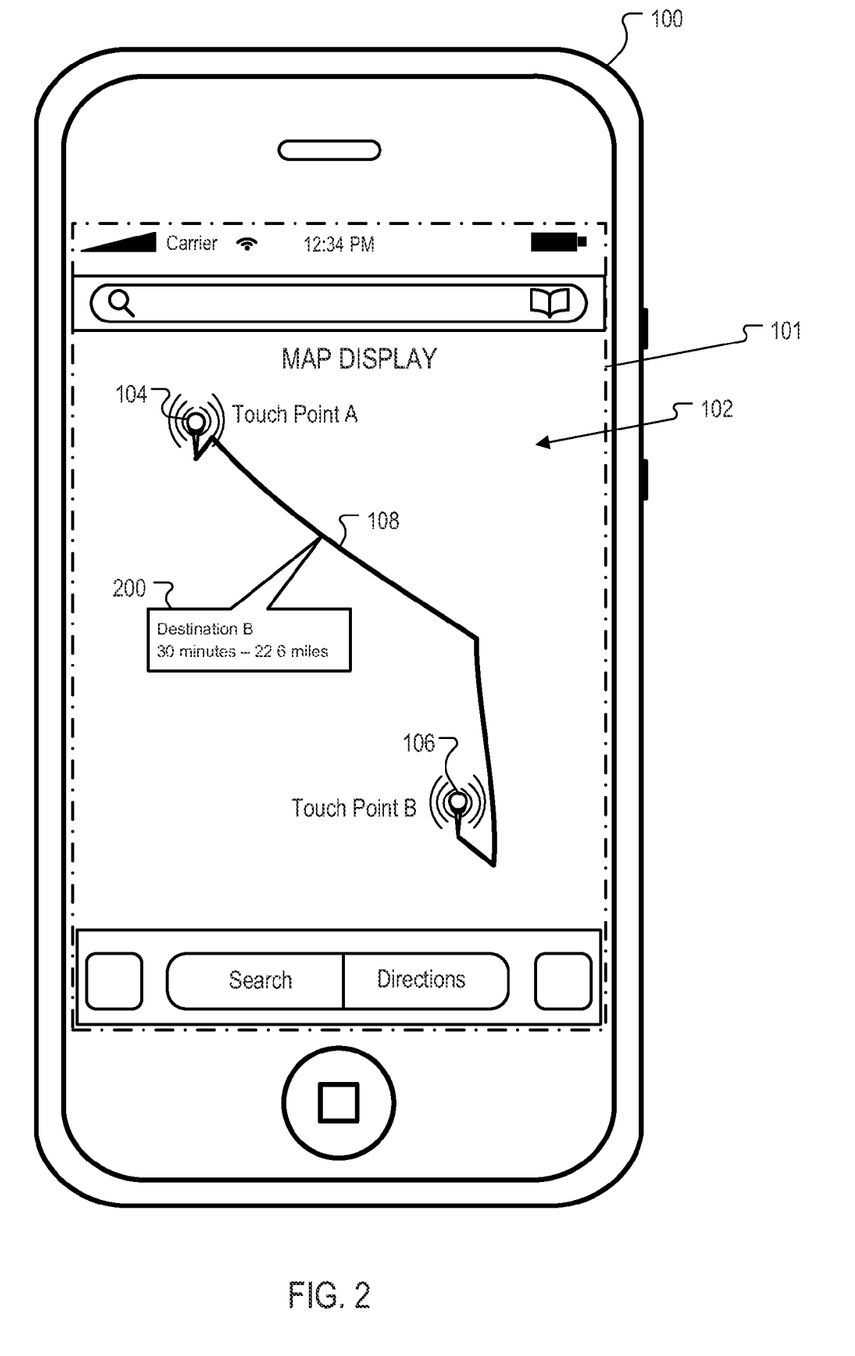
FIG. 2 illustrates the use of multiple touch points defining a route on a map display to provide information.

FIG. 2 illustrates the use of multiple touch points defining route 108 on map display 102 to provide information. In the example shown, the user has touched markers 104, 106 with, for example, her thumb and index or middle finger. The touches can be simultaneous or performed in a specific order (touch marker 104 then touch marker 106 while maintaining the touch on marker 104 or vice versa). In response to this touch input, callout 200 is presented on map display 102 containing information related to the route (e.g., travel information). Callout 200 can be any suitable user interface element for displaying information, such as a balloon (shown in FIG. 2), a pop-up window, semi-transparent overlay, sliding pane or other suitable user interface element with or without animation effects. Callout 200 can be displayed temporarily. For example, callout 200 can be displayed for a predefined period of time (e.g., 3 seconds) before being removed from map display 102. In some implementations, callout 200 can be persistently displayed for as long as one or both of the user's fingers remain in contact with markers 104, 106. In some implementations, callout 200 can be persistently displayed for a period of time after the user ceases touching one or both of markers 104, 106. Any suitable information can be included in callout 200. Some examples include but are not limited to travel distance, estimated travel time, estimated fuel usage, points of interest, photos, embedded links (e.g., web address, telephone numbers), metadata, icons, content, etc. In some implementations, route 108 between markers 104, 106 is displayed only when callout 200 is displayed on map display 102 and is removed when callout 200 is removed from map display 102.

Figure 3:
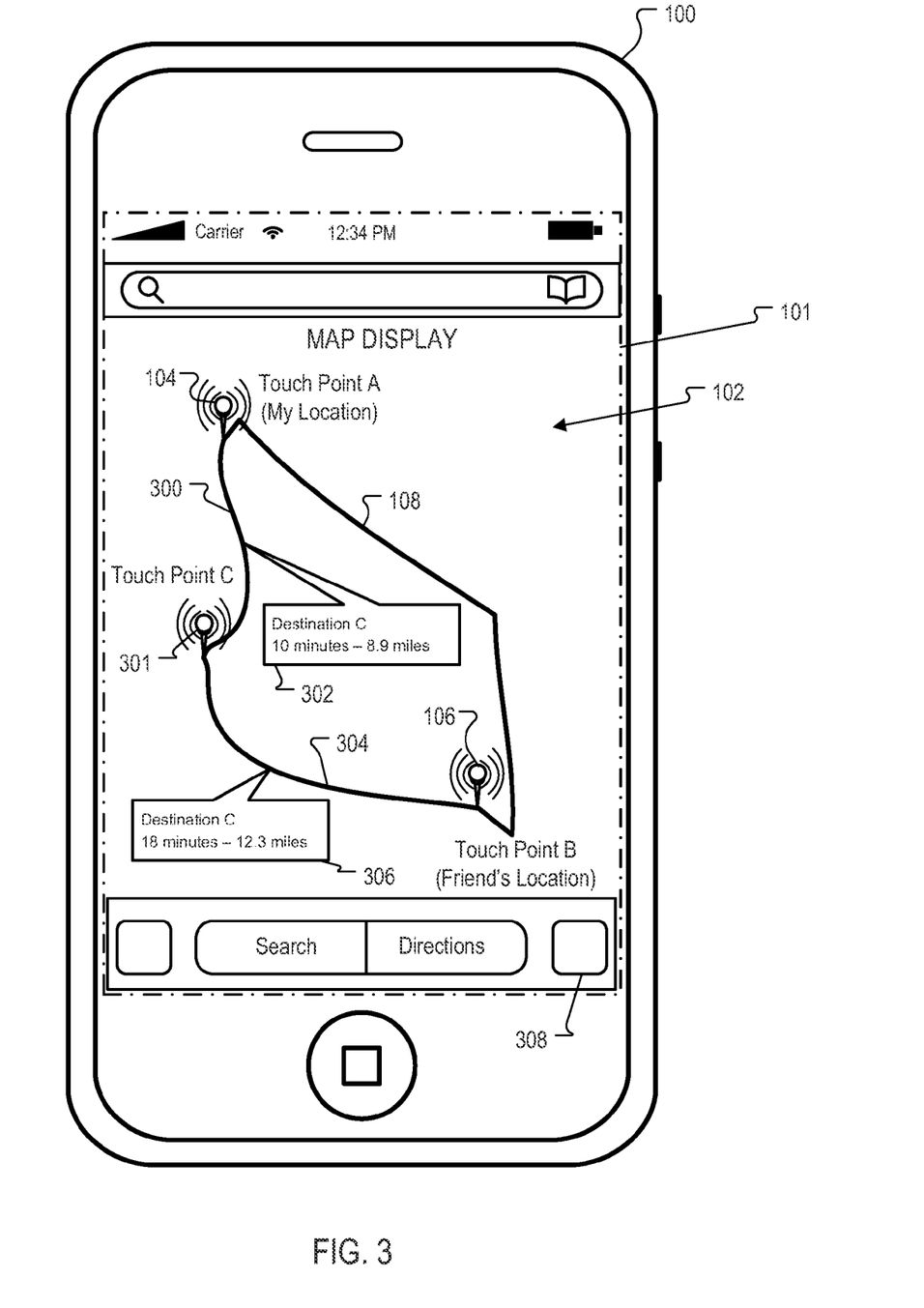
FIG. 3 illustrates the use of multiple touch points defining multiple routes on a map display to provide information.

FIG. 3 illustrates the use of multiple touch points defining multiple routes on a map display to provide information. In the example shown, the user has touched markers 104, 106, 301 with, for example, her thumb, index finger and middle finger. The touches can be simultaneous or in a specific order.

Markers 104, 106, 301 define three routes 108, 300 and 304. Route 108 was described in reference to FIG. 2. Route 300 is between markers 104 and 301 and route 304 is between markers 301 and 106. In response to this touch input, callouts 302, 306 are presented on map display 102. The user can receive information from all three callouts 200, 300, 304.

In some implementations, the order of the touches can determine the travel information displayed. For example, one marker can represent a current location of device 101 and one or more markers can indicate the current locations of other devices, such as devices carried by friends or family. In this scenario, information can be provided for multiple routes where the current or departure and destination locations are determined by the order of the touches on the markers. The first marker touched becomes the current or departure location and the second marker touched becomes the destination location. For example, the current location of device 100 can be represented by marker 104 and the location of a friend's device can be represented by marker 106. The user of device 100 can expose information for the friend by touching marker 106, then touching marker 301 while still touching marker 104.

In some implementations, a button or other user interface element 308 can be presented to allow sharing of routes and travel information with other users. For example, by touching button 308, a sharing dialogue can be presented on display 101 that allows the user of device 100 to initiate sharing route or travel information displayed on map display 102 with other users. In some implementations, the sharing can be automatic to devices represented by markers on map display 308. In other implementations, a dialogue can be presented allowing the user of device 100 to select one or more users to share information.

Figure 4A:
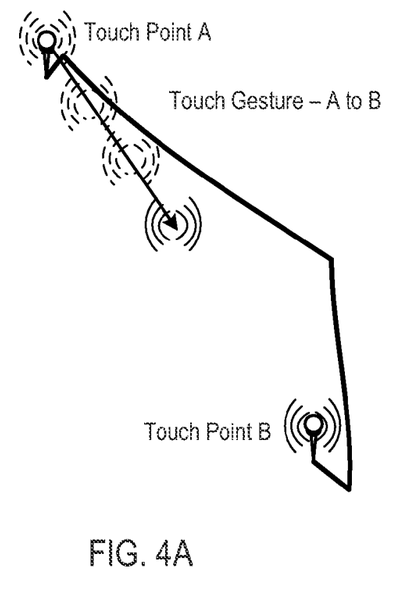
FIGS. 4A-4D illustrates the use of touch gestures to provide travel directions for a route on a map display.
Figure 4B:
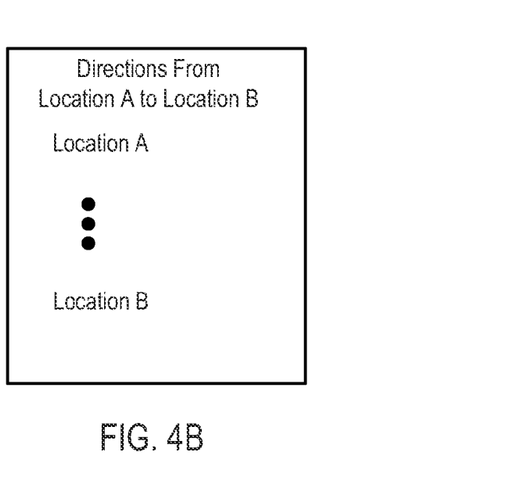

FIGS. 4A-4D illustrate the use of touch gestures to provide travel directions (e.g., turn-by-turn driving directions) for a route on a map display. In some implementations, touch gestures can be used to invoke travel directions. In the example shown in FIG. 4A, the user is simultaneously touching touch point A and touch point B. This can be accomplished, for example, with the user's thumb and index or middle finger. If the user maintains touch point B with their thumb while sliding their index or middle finger towards touch point B, travel directions (e.g., turn-by-turn directions) for the route from touch point A (departure) to touch point B (destination) are displayed on touch sensitive display 101. That is, the direction of the slide indicates the user's desired travel directions, as shown in FIG. 4B.

Figure 4C:
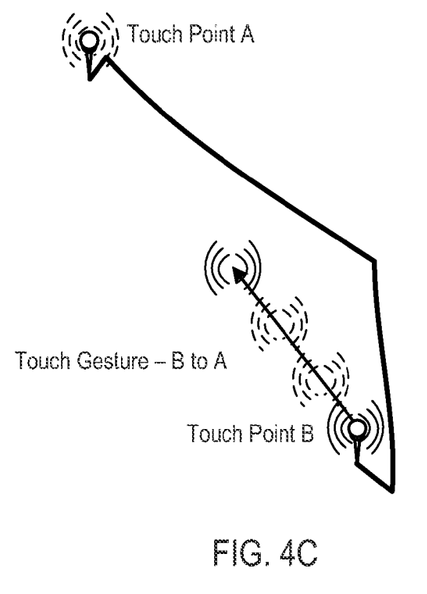
Figure 4D:
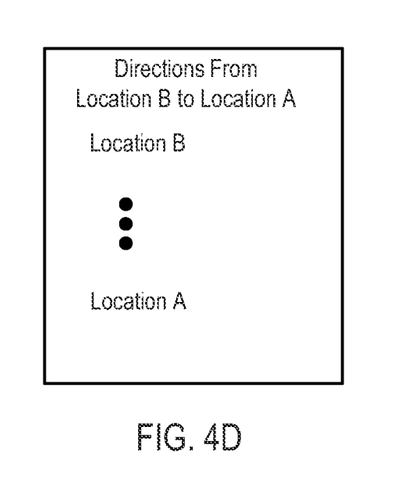

FIGS. 4C and 4D illustrate the reverse case. In the example shown in FIG. 4C, the user is simultaneously touching touch point A and touch point B. If the user maintains touch point A with their index or middle finger while sliding their thumb towards touch point A, travel directions (e.g., turn-by-turn directions) for the route from touch point B (departure) to touch point A (destination) are displayed on display 101.

In some implementations, the order of touch input (which marker is touched first and which marker is touched last in a sequence of touches) can indicate the marker that represents a current or departure location and the marker that represents a destination location. Directions can be provided according to the order. For example, the user touches marker 104 first indicating that marker 104 represents a current or departure location and then touches marker 106 while still touching marker 104, indicating that marker 106 represents a destination location. For this order of touches, travel directions are provided from a current or departure location represented by marker 104 to a destination location represented by marker 106.

Example Processes

Figure 5:
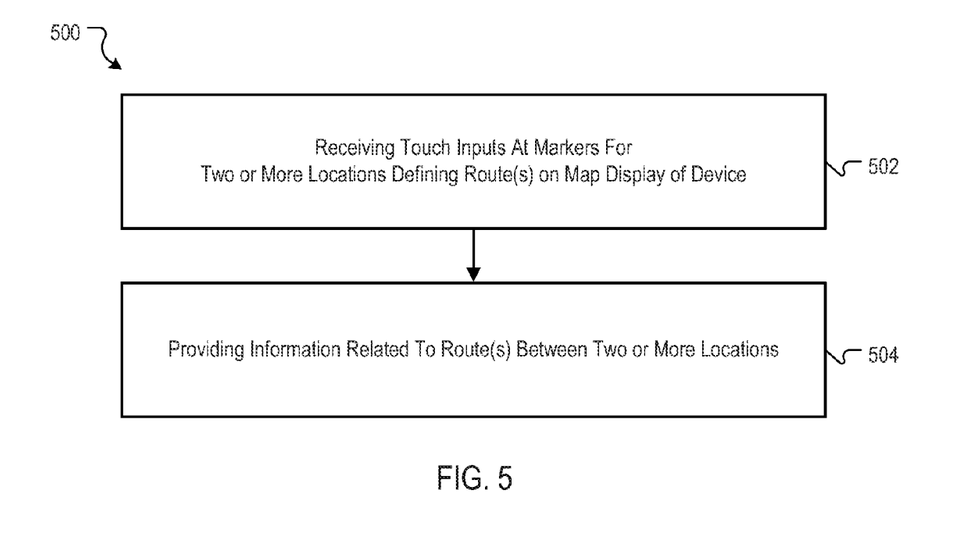
FIG. 5 is a flow diagram of an example process for providing information based on multiple touch inputs.

FIG. 5 is a flow diagram of an example process 500 for providing travel information based on touch input from two or more touch points. Process 500 can be implemented on device 100 using operating environment 700 and device architecture 800.

In some implementations, process 500 can begin by receiving simultaneous touch inputs at markers for two or more locations defining one or more routes on a map display (502). The map display can be provided by a client map application running on a device and/or search engine and/or mapping service 730, as described in reference to FIG. 7. The markers can be displayed in response to a search query, voice command or any other suitable source input.

Process 500 can continue by providing information related to the one or more routes between two or more locations (504). The information can be provided for point-to-point routes, point-to-multipoint routes and multipoint-to-multipoint routes. The type of information provided can be based on the order in which touches are made on markers, as described in reference to FIG. 3. Information (e.g., route and other travel information) can be shared with other users through, for example, operating environment 700. Information can be any information related to a route between two markers, such as travel distance and estimated travel time. The information can be presented to the user using any suitable user interface element. Information can also be provided as audio through headphones or a loudspeaker.

Figure 6:
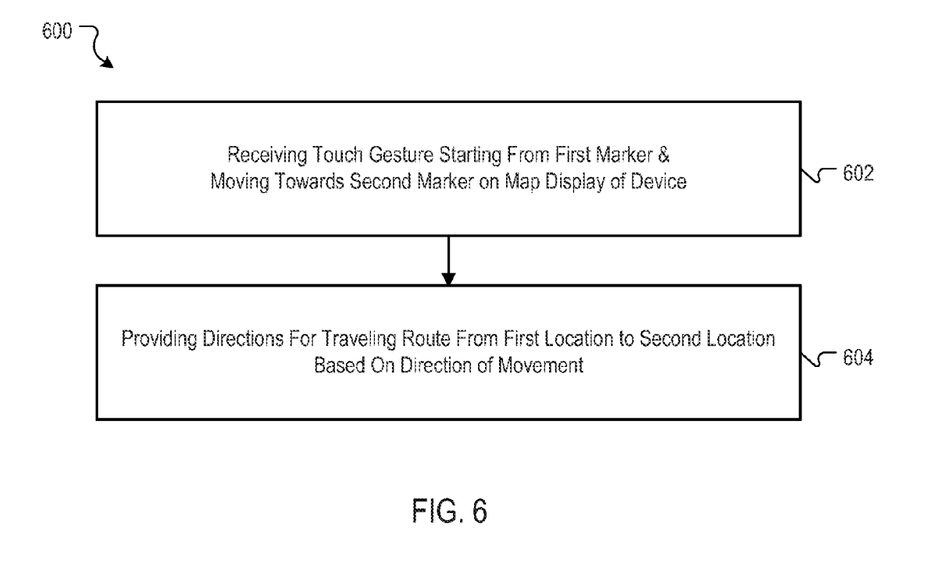
FIG. 6 is a flow diagram of an example process for providing travel directions based on touch gestures.

FIG. 6 is a flow diagram of an example process 600 for providing route directions based on touch gesture input associated with two touch points. Process 600 can be implemented on device 100 using operating environment 700 and device architecture 800.

In some implementations, process 600 can begin by receiving a touch gesture starting from a first marker and moving towards a second marker on a map display (602). For example, the touch gesture can be as described in reference to FIGS. 4A-4D. In other implementations, the order of the touches can indicate the marker that represents a current or departure location and the marker that represents a destination location, and then produce travel directions according to the order. In some implementations, other gestures can be used to invoke automatically travel directions.

Process 600 can continue by providing travel directions from the first location to the second location based on the gesture (604). Travel directions can be, for example, turn-by-turn driving directions. In some implementations, travel directions can be provided for a variety of transportation modes, including pedestrian, bike, train, mass transit, etc.

Example Operating Environment

Figure 7:
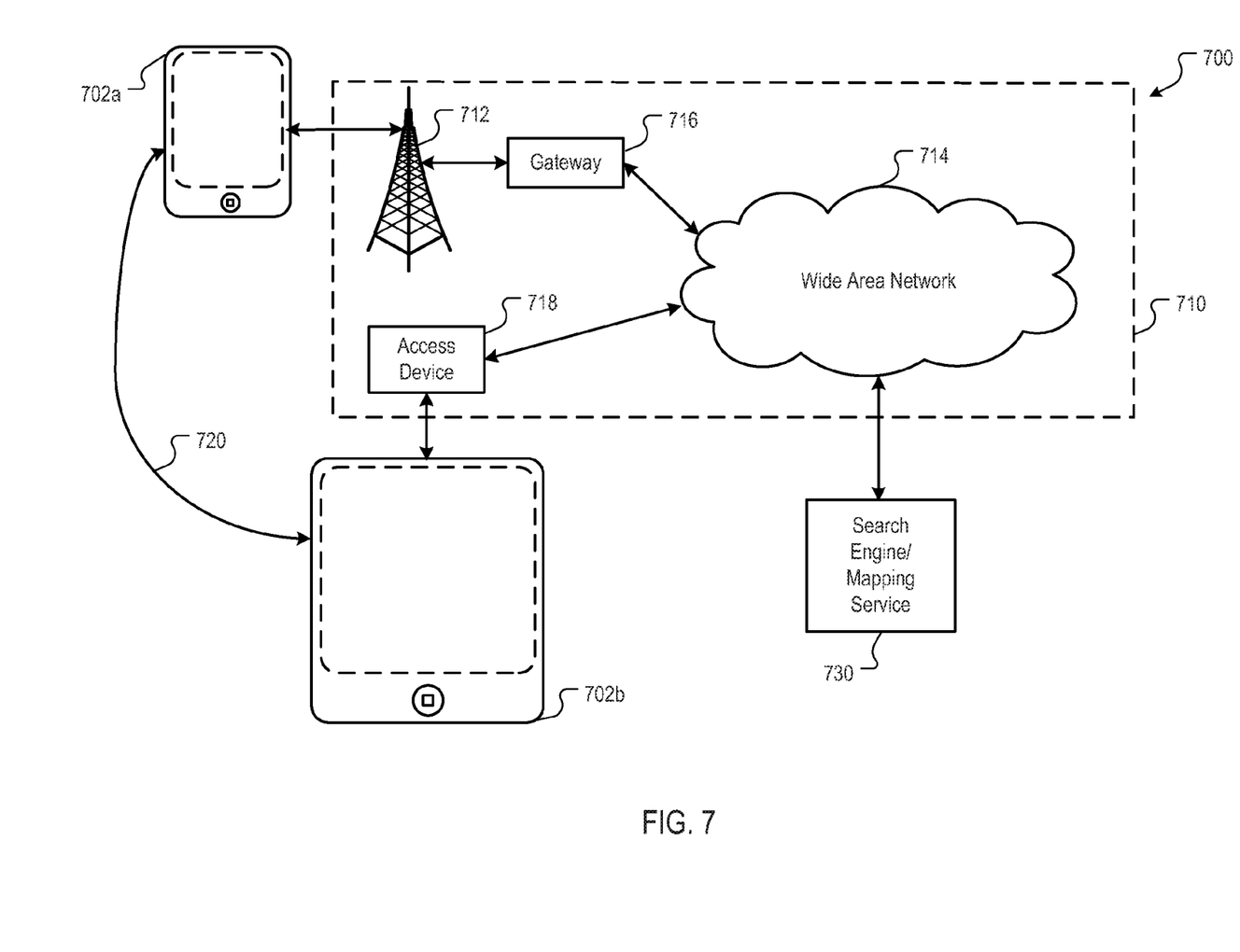
FIG. 7 is a block diagram of an exemplary operating environment capable of providing a networked-based mapping/search engine service that can provide the features or processes described in reference to FIGS. 1-6.

FIG. 7 is a block diagram of an example operating environment capable of providing a networked-based mapping/search engine service that can provide the features or processes described in reference to FIGS. 1-6.

In some implementations, devices 702a and 702b can communicate over one or more wired or wireless networks 710. For example, wireless network 712 (e.g., a cellular network) can communicate with a wide area network (WAN) 714 (e.g., the Internet) by use of gateway 717. Likewise, access device 718 (e.g., IEEE 802.11g wireless access device) can provide communication access to WAN 714. Devices 702a, 702b can include but is not limited to portable computers, smart phones and electronic tablets. In some implementations, the devices 702a, 702b do not have to be portable but can be a desktop computer, television system, kiosk system or the like.

In some implementations, both voice and data communications can be established over wireless network 712 and access device 718. For example, device 702a can place and receive phone calls (e.g., using voice over Internet Protocol (VoIP) protocols), send and receive e-mail messages (e.g., using SMPTP or Post Office Protocol 3 (POP3)), and retrieve electronic documents and/or streams, such as web pages, photographs, and videos, over wireless network 712, gateway 716, and WAN 714 (e.g., using Transmission Control Protocol/Internet Protocol (TCP/IP) or User Datagram Protocol (UDP)). Likewise, in some implementations, device 702b can place and receive phone calls, send and receive e-mail messages, and retrieve electronic documents over access device 718 and WAN 714. In some implementations, device 702a or 702b can be physically connected to access device 718 using one or more cables and access device 718 can be a personal computer. In this configuration, device 702a or 702b can be referred to as a "tethered" device.

Devices 702a and 702b can also establish communications by other means. For example, wireless device 702a can communicate with other wireless devices (e.g., other devices 702a or 702b, cell phones) over the wireless network 712. Likewise, devices 702a and 702b can establish peer-to-peer communications 720 (e.g., a personal area network) by use of one or more communication subsystems, such as the Bluetooth™ communication devices. Other communication protocols and topologies can also be implemented.

Devices 702a or 702b can communicate with service 730 over the one or more wired and/or wireless networks 710. For example, service 730 can be a search engine and/or mapping application that performs one or more of the processes described in reference to FIGS. 1-6.

Device 702a or 702b can also access other data and content over one or more wired and/or wireless networks 710. For example, content publishers, such as news sites, Really Simple Syndication (RSS) feeds, Web sites and developer networks can be accessed by device 702a or 702b. Such access can be provided by invocation of a web browsing function or application (e.g., a browser) running on the device 702a or 702b.

Devices 702a and 702b can exchange files over one or more wireless or wired networks 710 either directly or through service 730.

Example Device Architecture

Figure 8:
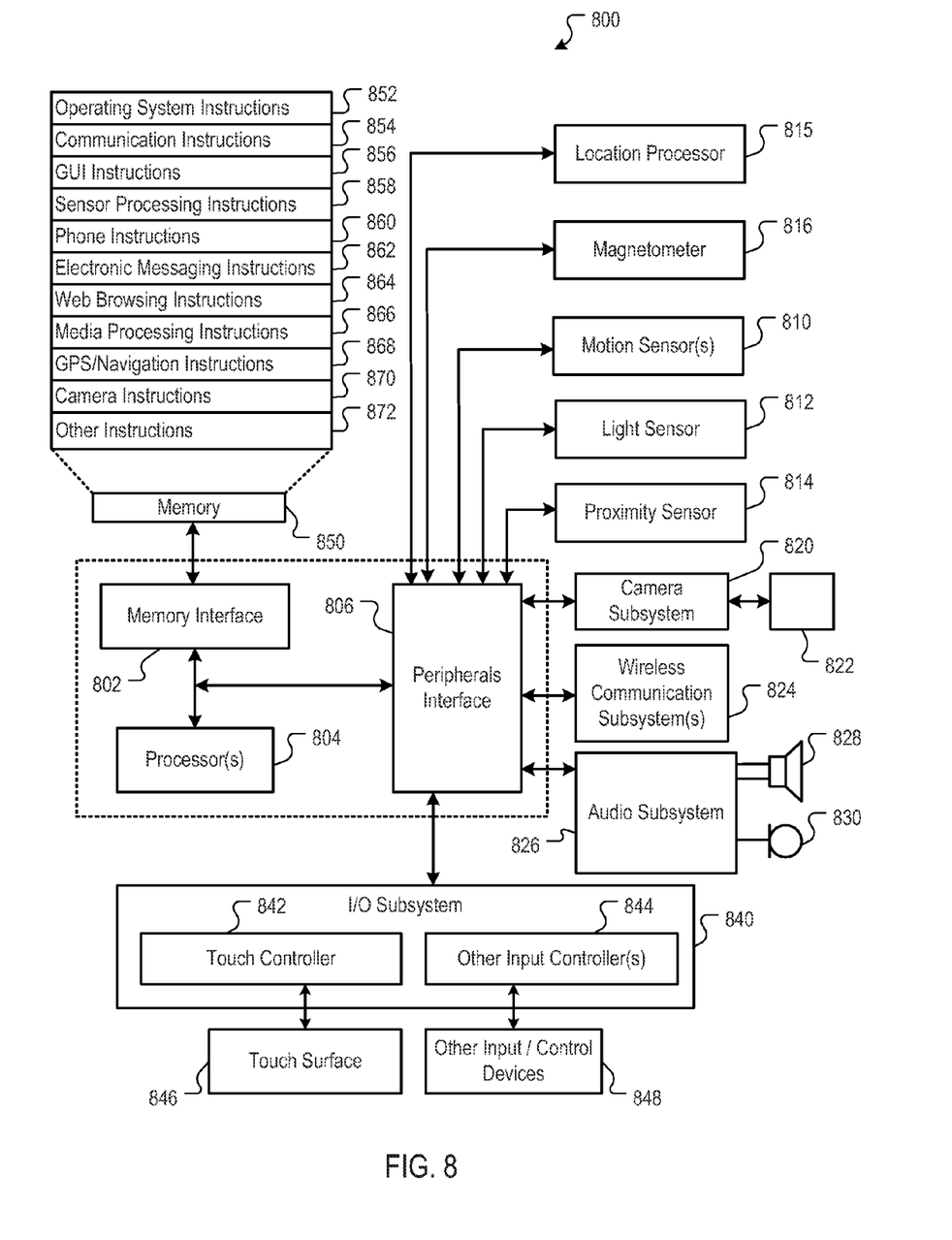
FIG. 8 is a block diagram of an exemplary architecture of a device capable of running a search engine/mapping application that provides a mapping/search engine service that can provide the features and processes described in reference to FIGS. 1-6.

FIG. 8 is a block diagram of an example architecture 800 of a device capable of implementing the features and processes described in reference to FIGS. 1-6.

Architecture 800 can be implemented in any device for generating the features described in reference to FIGS. 1-6, including but not limited to portable or desktop computers, smart phones and electronic tablets, television systems, game consoles, kiosks and the like. Architecture 800 can include memory interface 802, data processor(s), image processor(s) or central processing unit(s) 804, and peripherals interface 806. Memory interface 802, processor(s) 804 or peripherals interface 806 can be separate components or can be integrated in one or more integrated circuits. The various components can be coupled by one or more communication buses or signal lines.

Sensors, devices, and subsystems can be coupled to peripherals interface 806 to facilitate multiple functionalities. For example, motion sensor 810, light sensor 812, and proximity sensor 814 can be coupled to peripherals interface 806 to facilitate orientation, lighting, and proximity functions of the device. For example, in some implementations, light sensor 812 can be utilized to facilitate adjusting the brightness of touch surface 846. In some implementations, motion sensor 810 (e.g., an accelerometer, gyros) can be utilized to detect movement and orientation of the device. Accordingly, display objects or media can be presented according to a detected orientation (e.g., portrait or landscape).

Other sensors can also be connected to peripherals interface 806, such as a temperature sensor, a biometric sensor, or other sensing device, to facilitate related functionalities.

Location processor 815 (e.g., GPS receiver) can be connected to peripherals interface 806 to provide geo-positioning. Electronic magnetometer 816 (e.g., an integrated circuit chip) can also be connected to peripherals interface 806 to provide data that can be used to determine the direction of magnetic North. Thus, electronic magnetometer 816 can be used as an electronic compass.

Camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 824. Communication subsystem(s) 824 can include one or more wireless communication subsystems. Wireless communication subsystems 824 can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 824 can depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, and a Bluetooth™ network. Communication subsystems 824 may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 826 can be coupled to a speaker 828 and one or more microphones 830 to facilitate voice-enabled functions, such as voice recognition, voice replication, digital recording, and telephony functions.

I/O subsystem 840 can include touch controller 842 and/or other input controller(s) 844. Touch controller 842 can be coupled to a touch surface 846. Touch surface 846 and touch controller 842 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 846. In one implementation, touch surface 846 can display virtual or soft buttons and a virtual keyboard, which can be used as an input/output device by the user.

Other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In some implementations, device 800 can present recorded audio and/or video files, such as MP3, AAC, and MPEG files. In some implementations, device 800 can include the functionality of an MP3 player and may include a pin connector for tethering to other devices. Other input/output and control devices can be used.

Memory interface 802 can be coupled to memory 850. Memory 850 can include high-speed random access memory or non-volatile memory, such as one or more magnetic disk storage devices, one or more optical storage devices, or flash memory (e.g., NAND, NOR). Memory 850 can store operating system 852, such as Darwin, RTXC, LINUX, UNIX, OS X, WINDOWS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers or servers. Communication instructions 854 can also be used to select an operational mode or communication medium for use by the device, based on a geographic location (obtained by the GPS/Navigation instructions 868) of the device. Memory 850 may include graphical user interface instructions 856 to facilitate graphic user interface processing, including a touch model for interpreting the touch inputs and gestures described in reference to FIGS. 1-6; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes; camera instructions 870 to facilitate camera-related processes and functions; and other instructions 872 for facilitating other processes, features and applications, such as applications related to generating map displays and processing touch and gesture inputs, as described in reference to FIGS. 1-6.

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the device may be implemented in hardware and/or in software, including in one or more signal processing and/or application specific integrated circuits.

The features described can be implemented in digital electronic circuitry or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer can communicate with mass storage devices for storing data files. These mass storage devices can include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with an author, the features can be implemented on a computer having a display device such as a CRT (cathode ray tube) or LCD (liquid crystal display) monitor for displaying information to the author and a keyboard and a pointing device such as a mouse or a trackball by which the author can provide input to the computer.

The features can be implemented in a computer system that includes a back-end component, such as a data server or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an Application Programming Interface (API). An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. The systems and techniques presented herein are also applicable to other electronic text such as electronic newspaper, electronic magazine, electronic documents etc. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
receiving touch inputs at markers representing multiple locations associated with multiple routes on a map display of a device, where receiving the touch inputs at markers includes:
receiving a first touch input at a first marker;
receiving a second touch input at a second marker while receiving the first touch input; and
receiving a third touch input at a third marker while receiving the first and second touch inputs; and
responsive to the touch inputs:
providing information related to a first route having endpoints at the first and second markers; and
providing information related to a second route having endpoints at the first and third markers while providing the information related to the first route,
where the first route is different than the second route, and
where the method is performed by one or more hardware processors.

2. The method of claim 1, where the first or second marker represents a current location of another device.

3. The method of claim 1, where the information related to the first route and the information related to the second route include travel information.

4. The method of claim 1, where the information related to the first route and the information related to the second route are presented as audio played over a loudspeaker or headphones.

5. The method of claim 1, where the second and third touch inputs are received simultaneously.

6. The method of claim 1, further comprising:
providing information related to a third route having endpoints at the second and third markers while providing the information related to the first route and the information related to the second route.

7. A method comprising:
receiving a first touch input at a first marker representing a first location on a map display of a device, wherein the first touch input is generated by holding a first pointer device against a touch sensitive surface of the device at the first marker;
receiving a second touch input at a second marker representing a second location on the map display, wherein the second touch input is generated by holding a second pointer device against the touch sensitive surface at the second marker;
receiving a gesture input, where the gesture input is generated by:
maintaining physical contact between the second pointer device and the touch sensitive surface at the second marker; and
while maintaining physical contact between the second pointer device and the touch sensitive surface at the second marker, sliding the first pointer device along the touch sensitive surface along a path from the first marker towards the second marker; and determining a route from the first location to the second location based on the gesture input, where the path of the gesture input is distinct from the route, and where the method is performed by one or more hardware processors.

8. A system comprising:

one or more processors;

memory coupled to the one or more processors storing instructions, which, when executed by the one or more processors, causes the one or more processors to perform operations comprising:

receiving touch inputs at markers representing multiple locations associated with multiple routes on a map display of a device, where receiving the touch inputs at markers includes:

receiving a first touch input at a first marker;

receiving a second touch input at a second marker while receiving the first touch input; and receiving a third touch input at a third marker while receiving the first and second touch inputs; and responsive to the touch inputs:

providing information related to a first route having endpoints at the first and second markers; and providing information related to a second route having endpoints at the first and third markers while providing the information related to the first route, where the first route is different than the second route.

9. The system of claim 8, where the first or second marker represents a current location of another device.

10. The system of claim 8, where the information related to the first route and the information related to the second route include travel information.

11. The system of claim 8, where the information related to the first route and the information related to the second route are presented as audio played over a loudspeaker or headphones.

12. The system of claim 8, where the second and third touch inputs are received simultaneously.

13. The system of claim 8, the memory further including instructions, which, when executed by the one or more processors, causes the one or more processors to perform operations comprising:

providing information related to a third route having endpoints at the second and third markers while providing the information related to the first route and the information related to the second route.

14. A system comprising:

one or more processors;

memory coupled to the one or more processors storing instructions, which, when executed by the one or more processors, causes the one or more processors to perform operations comprising:

receiving a first touch input at a first marker representing a first location on a map display of a device, wherein the first touch input is generated by holding a first pointer device against a touch sensitive surface of the device at the first marker;

receiving a second touch input at a second marker representing a second location on the map display, wherein the second touch input is generated by holding a second pointer device against the touch sensitive surface at the second marker;

receiving a gesture input, where the gesture input is generated by:

maintaining physical contact between the second pointer device and the touch sensitive surface at the second marker; and while maintaining physical contact between the second pointer device and the touch sensitive surface at the second marker, sliding the first pointer device along the touch sensitive surface along a path from the first marker towards the second marker; and determining a route from the first location to the second location based on the gesture input, where the path of the gesture input is distinct from the route.

15. The method of claim 1, where at least a portion of the first route is distinct from the second route, and where at least a portion of the second route is distinct from the first route.

16. The system of claim 8, where at least a portion of the first route is distinct from the second route, and where at least a portion of the second route is distinct from the first route.

17. The method of claim 1, wherein the touch inputs are generated by holding one or more pointer devices against a touch sensitive surface of the device.

18. The method of claim 17, wherein the one or more pointer devices comprise one or more fingers or styluses.

19. The method of claim 1, wherein the information related to the first route comprises travel directions from the first marker to the second marker.

20. The method of claim 1, wherein the information related to the second route comprises travel directions from the first marker to the third marker.

21. The system of claim 8, wherein the touch inputs are generated by holding one or more pointer devices against a touch sensitive surface of the device.

22. The method of claim 21, wherein the one or more pointer devices comprise one or more fingers or styluses.

23. The system of claim 8, wherein the information related to the first route comprises travel directions from the first marker to the second marker.

24. The system of claim 8, wherein the information related to the second route comprises travel directions from the first marker to the third marker.

25. The method of claim 7, wherein the first pointer device comprises a first finger or stylus, and wherein the second pointer device comprises a second finger or stylus.

26. The method of claim 7, further comprising:

presenting, to a user, information regarding the route from the first location to the second location.

27. The method of claim 26, wherein the information comprises travel directions from the first location to the second location.

28. The method of claim 9, wherein the information is displayed on the touch sensitive surface.

29. The method of claim 7, wherein the path of the gesture input extends partially to the second marker.

30. The system of claim 14, wherein the first pointer device comprises a first finger or stylus, and wherein the second pointer device comprises a second finger or stylus.

31. The system of claim 14, wherein the operations further comprise:

presenting, to a user, information regarding the route from the first location to the second location.

32. The system of claim 31, wherein the information comprises travel directions from the first location to the second location.

33. The system of claim 31, wherein the information is displayed on the touch sensitive surface.

34. The system of claim 14, wherein the path of the gesture input extends partially to the second marker.

\* \* \* \* \*

UNITED STATES PATENT AND TRADEMARK OFFICE
CERTIFICATE OF CORRECTION

PATENT NO. : 9,494,442 B2  Page 1 of 1
APPLICATION NO. : 13/627985
DATED : November 15, 2016
INVENTOR(S) : Devrim Varoglu et al.

It is certified that error appears in the above-identified patent and that said Letters Patent is hereby corrected as shown below:

In the Claims

Column 12, Line 54: In Claim 28, delete "9," and insert -- 26, --, therefor.

Signed and Sealed this
Twenty-fourth Day of January, 2017

Michelle K. Lee
*Director of the United States Patent and Trademark Office*